United States Patent
Emmert (10) Patent No.: US 8,280,854 B1
(45) Date of Patent: Oct. 2, 2012

(54) SYSTEMS AND METHODS FOR RELOCATING DEDUPLICATED DATA WITHIN A MULTI-DEVICE STORAGE SYSTEM

(75) Inventor: Travis Emmert, Maplewood, MN (US)

(73) Assignee: Symantec Corporation, Mountain View, CA (US)

( * ) Notice: Subject to any disclaimer, the term of this patent is extended or adjusted under 35 U.S.C. 154(b) by 338 days.

(21) Appl. No.: 12/552,089

(22) Filed: Sep. 1, 2009

(51) Int. Cl.
*G06F 17/30* (2006.01)

(52) U.S. Cl. .......................... 707/664; 707/637; 707/758

(58) Field of Classification Search .................. 707/637, 707/664, 651, 829, 999.204, 999.107, 999.1, 707/999.101
See application file for complete search history.

(56) References Cited

U.S. PATENT DOCUMENTS

| | | | | |
|---|---|---|---|---|
| 6,021,408 | A | 2/2000 | Ledain et al. | |
| 7,301,448 | B1 * | 11/2007 | Usery et al. | 340/506 |
| 7,567,188 | B1 * | 7/2009 | Anglin et al. | 341/63 |
| 7,669,023 | B2 * | 2/2010 | Murase | 711/162 |
| 7,769,971 | B2 * | 8/2010 | Cremelie et al. | 711/162 |
| 7,818,535 | B1 * | 10/2010 | Bono et al. | 711/173 |
| 7,831,793 | B2 * | 11/2010 | Chakravarty et al. | 711/165 |
| 7,870,105 | B2 * | 1/2011 | Arakawa et al. | 707/692 |
| 7,921,086 | B1 * | 4/2011 | Bromley et al. | 707/692 |
| 7,930,306 | B2 * | 4/2011 | Scholtes et al. | 707/750 |
| 7,941,459 | B1 * | 5/2011 | Erickson | 707/803 |
| 7,949,662 | B2 * | 5/2011 | Farber et al. | 707/747 |
| 2008/0244172 | A1 | 10/2008 | Kano | |
| 2009/0319585 | A1 | 12/2009 | Gokhale | |
| 2010/0313040 | A1 | 12/2010 | Lumb | |

OTHER PUBLICATIONS

Schmid, Patrick; "I/O, Continued"; Tom's Hardware; Aug. 13, 2007; http://www.tomshardware.com/reviews/flash-basedhard-drivescometh ,1666-10.html.
Mellor, Chris; "Data Domain sticks neck out on deduping"; The Register; Feb. 9, 2009; http://www.theregister.co.uk/2009/02/09/data_domain_dedupe_sans/page2.html.
Karche, Ganesh et al.; "Using Dynamic Storage Tiering;" Symantec Yellow Books; 2006; Symantec Corporation; CA.
Sudhakar Paulzagade et al.; Systems and Methods for Restoring Deduplicated Data; U.S. Appl. No. 12/572,532, filed Oct. 2, 2009.
Non-Final Office Action Received in Related U.S. Appl. No. 12/572,532; Oct. 26, 2011.

* cited by examiner

*Primary Examiner* — Leslie Wong
(74) *Attorney, Agent, or Firm* — Advantedge Law Group (57) ABSTRACT

A computer-implemented method for relocating deduplicated data within a multi-device storage system. The method may include identifying a set of deduplicated data units stored on a first device of the multi-device storage system. Each data unit in the set of data units is referred to by one or more deduplication references. The method may also include procuring reference data that indicates, for each data unit in the set of deduplicated data units, the number of deduplication references that point to the data unit. The method may further include using the reference data to select one or more data units from the set of deduplicated data units for relocation to a second device in the multi-device storage system and relocating the one or more data units to the second device in the multi-device storage system. Various other methods, systems, and computer-readable media are also disclosed.

19 Claims, 6 Drawing Sheets

SYSTEMS AND METHODS FOR RELOCATING DEDUPLICATED DATA WITHIN A MULTI-DEVICE STORAGE SYSTEM

BACKGROUND

Multi-tier storage—the use of virtual or physical storage devices with different I/O performance, data availability, and relative cost characteristics to provide differentiated online storage for computer systems—is implemented by many enterprises to optimize storage and I/O cost and performance. A traditional approach to deriving value from multiple tiers of storage is to place files on the appropriate type of storage device. More critical files are typically placed on higher-performing, more reliable (and therefore more expensive) devices; less critical files may be placed on less costly devices.

For traditional backup systems, matching a file to the most efficient storage device may seem straightforward. For example, administrators may assign files to the most efficient type of storage. However, administrators cannot effectively assign large numbers of files in this way. Thus, some multi-tier storage systems implement automatic file relocation policies that are based on access patterns of files. Unfortunately, using access patterns to define relocation policies may not result in efficient relocation in some circumstances.

SUMMARY

As will be described in greater detail below, the instant disclosure generally relates to systems and methods for relocating deduplicated data within a multi-device storage system. Rather than relying only on access patterns to determine how to relocate data, embodiments of the instant disclosure may perform relocation based on deduplication reference counts to deduplicated data units. For example, a method may include identifying a set of deduplicated data units stored on a first device of a multi-device storage system. Each data unit in the set of data units may be referred to by one or more deduplication references. The method may also include procuring reference data that indicates, for each data unit in the set of deduplicated data units, the number of deduplication references that point to the data unit. The method may further include using the reference data to select one or more data units from the set of deduplicated data units for relocation to a second device in the multi-device storage system and relocating the one or more data units to the second device in the multi-device storage system.

In some embodiments, the number of deduplication references that point to the data unit includes, for each data unit in the set of data units, at least one of: (1) the number of original data objects that point to the data unit; (2) the number of data object revisions that point to the data unit; and (3) the number of client devices associated with data objects that point to the data unit. The method may include counting at least one of: (1) the number of original data objects that point to the data unit; (2) the number of data object revisions that point to the data unit; and (3) the number of client devices associated with data objects that point to the data unit.

In some embodiments, procuring the reference data may include summing at least two of: (1) the number of original data objects that point to the data unit, (2) the number of data object revisions that point to the data unit, and (3) the number of client devices associated with data objects that point to the data unit. In such embodiments, procuring the reference data may include creating a first weighted count by multiplying the number of data object revisions by a first weight. Procuring the reference data may also include creating a second weighted count by multiplying at least one of the following by a second weight: the number of original data objects that point to the data unit and/or the number of client devices associated with data objects that point to the data unit. Procuring the reference data may further include summing the first and second weighted counts to provide the reference count for the data unit. In such embodiments, the first weight may be greater than the second weight.

Alternatively, procuring the reference data may include creating a first weighted count by multiplying a first weight by the number of client devices associated with data objects that point to the data unit. Procuring the reference data may further include creating a second weighted count by multiplying at least one of the following by a second weight: the number of original data objects that point to the data unit and/or the number of data object revisions that point to the data unit. In such embodiments, procuring the reference data may further include summing the first and second weighted counts to provide the reference count for the data unit, where the first weight is greater than the second weight.

According to various embodiments, procuring the reference data may include, for each data unit in the set of deduplicated data units: (1) using historical reference data to select a subset of references that point to the data unit that are more significant than other references that point to the data unit, and (2) multiplying references in the subset of references by a higher weight than the other references that point to the data unit. According to certain embodiments, procuring the reference data may include: (1) using historical data unit data to select a data unit from the set of data units that is more significant than other data units in the set of data units, (2) multiplying the number of deduplication references that point to the selected data unit by a first weight, and (3) multiplying the number of deduplication references that point to the other data units in the set of data units by a second weight. In such embodiments, the first weight may be greater than the second weight.

According to various embodiments, using the reference data to select one or more data units from the set of deduplicated data units for relocation to a second device in the multi-device storage system may include determining that the number of deduplication references that point to the one or more selected data units is greater than the number of deduplication references that point to one or more other data units in the set of deduplicated data units. In some embodiments, the second device in the multi-device storage system may be a solid-state drive.

According to certain embodiments, a system may include at least one processor. The system may also include an identification module programmed to direct the processor to identify a set of deduplicated data units stored on a first device of the multi-device storage system. Each data unit in the set of data units may be referred to by one or more deduplication references. The system may further include a data-collection module programmed to direct the processor to procure reference data that indicates, for each data unit in the set of deduplicated data units, the number of deduplication references that point to the data unit. The system may include a selection module programmed to direct the processor to use the reference data to select one or more data units from the set of deduplicated data units for relocation to a second device in the multi-device storage system. The system may also include a relocation module programmed to direct the processor to relocate the one or more data units to the second device in the multi-device storage system.

In some embodiments, the number of deduplication references that point to the data unit may include, for each data unit in the set of data units, at least one of: (1) the number of original data objects that point to the data unit, (2) the number of data object revisions that point to the data unit, and/or (3) the number of client devices associated with data objects that point to the data unit. According to certain embodiments, the data collection module may be further programmed to direct the processor to count at least one of: (1) the number of original data objects that point to the data unit, (2) the number of data object revisions that point to the data unit, and/or (3) the number of client devices associated with data objects that point to the data unit. In various embodiments, the data collection module may be programmed to direct the processor to procure the reference count by summing at least two of: (1) the number of original data objects that point to the data unit, (2) the number of data object revisions that point to the data unit, and/or (3) the number of client devices associated with data objects that point to the data unit.

Additionally or alternatively, the data protection module may be programmed to direct the processor to procure the reference count by creating a first weighted count by multiplying the number of data object revisions by a first weight and creating a second weighted count by multiplying at least one of the following by a second weight: (1) the number of original data objects that point to the data unit, and/or (2) the number of client devices associated with data objects that point to the data unit. The data protection module may also be programmed to sum the first and second weighted counts to provide the reference count for the data unit. The first weight may be greater than the second weight.

In some embodiments, the data protection module may be programmed to direct the processor to procure the reference count by creating a first weighted count by multiplying the number of client devices associated with data objects that point to the data unit and creating a second weighted count by multiplying at least one of the following by a second weight: (1) the number of original data objects that point to the data unit and/or (2) the number of data object revisions that point to the data unit. The data protection module may also be programmed to direct the processor to procure the reference count by summing the first and second weighted counts to provide the reference count for the data unit. The first weight may be greater than the second weight. In at least one embodiment, the second device in the multi-device storage system may be a solid-state drive.

According to certain embodiments, a method for relocating deduplicated data within a multi-device storage system may include identifying a set of deduplicated data units stored on a first device of the multi-device storage system. Each data unit in the set of data units may be referred to by one or more deduplication references. The method may also include determining, for each data unit in the set of deduplicated data units, a reference count that indicates the number of deduplication references that point to the data unit. The method may further include identifying a subset of data units in the set of deduplicated data units by determining that the reference count of each data unit in the subset of data units is higher than the reference count of one or more other data units in the set of deduplicated data units. The method may include relocating the subset of data units to a second device in the multi-device storage system.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

As will be described in greater detail below, the instant disclosure generally relates to systems and methods for relocating deduplicated data within a multi-device storage system. Some embodiments of this disclosure may place deduplicated data with a relatively high probability of being restored on a device with high performance for random access (e.g., a solid-state drive) to improve restoration efficiency of the deduplicated data. For example, a data relocation system may determine which deduplicated data units are pointed to by the highest number of references and may move these data units to a solid-state drive.

Moving deduplicated data units with relatively high reference counts to higher quality of service drives, such as solid-state drives, may provide many advantages. For example, restoring data (e.g., backed-up data, archived data, etc.) from disk drives of a deduplication system may result in a large amount of random access because the data may be stored across multiple servers and multiple sectors of devices within the servers. Since solid state drives may handle random access better (i.e., solid state drives do not suffer from head thrashing) and may have faster read times in general than disk drives, relocating data that is most likely to be restored (e.g., data with a high reference count) to solid-state drives may reduce latency of restores. Various other features and advantages of embodiments of the instant disclosure are presented in the following description.

Figure 1:
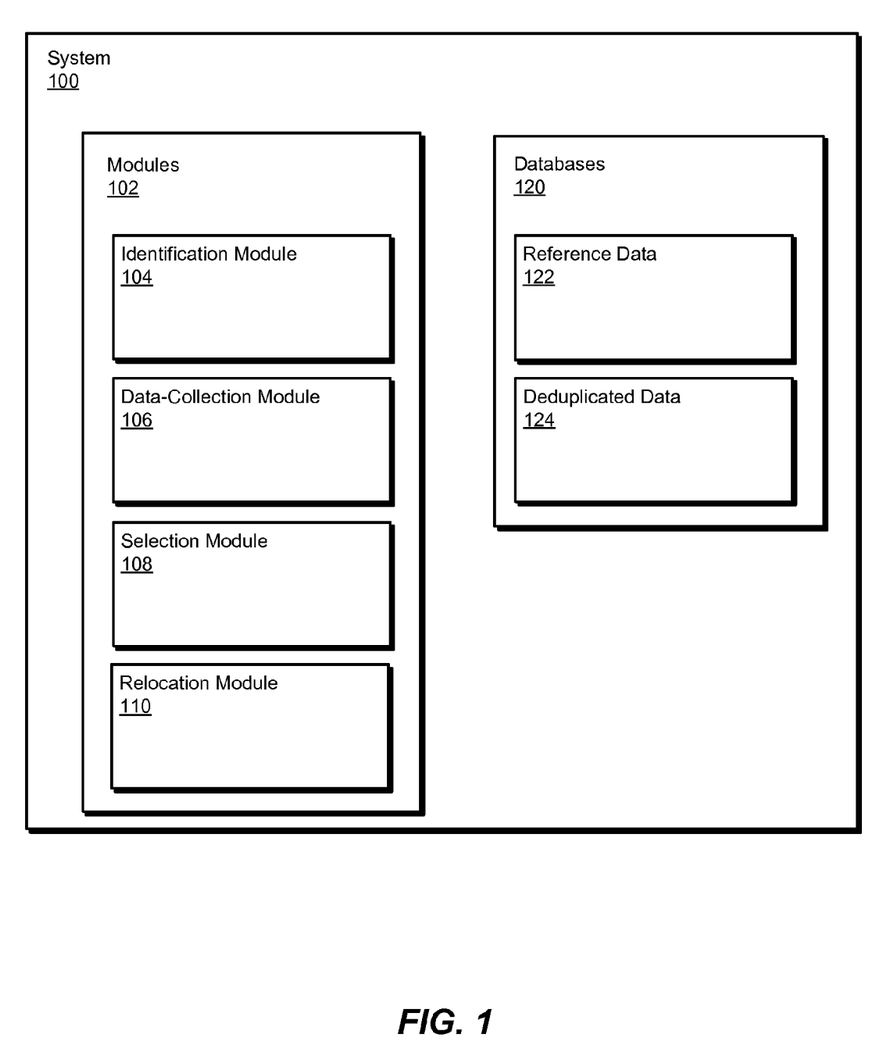
FIG. 1 is a block diagram of an exemplary system for relocating deduplicated data within a multi-device storage system.
Figure 2:
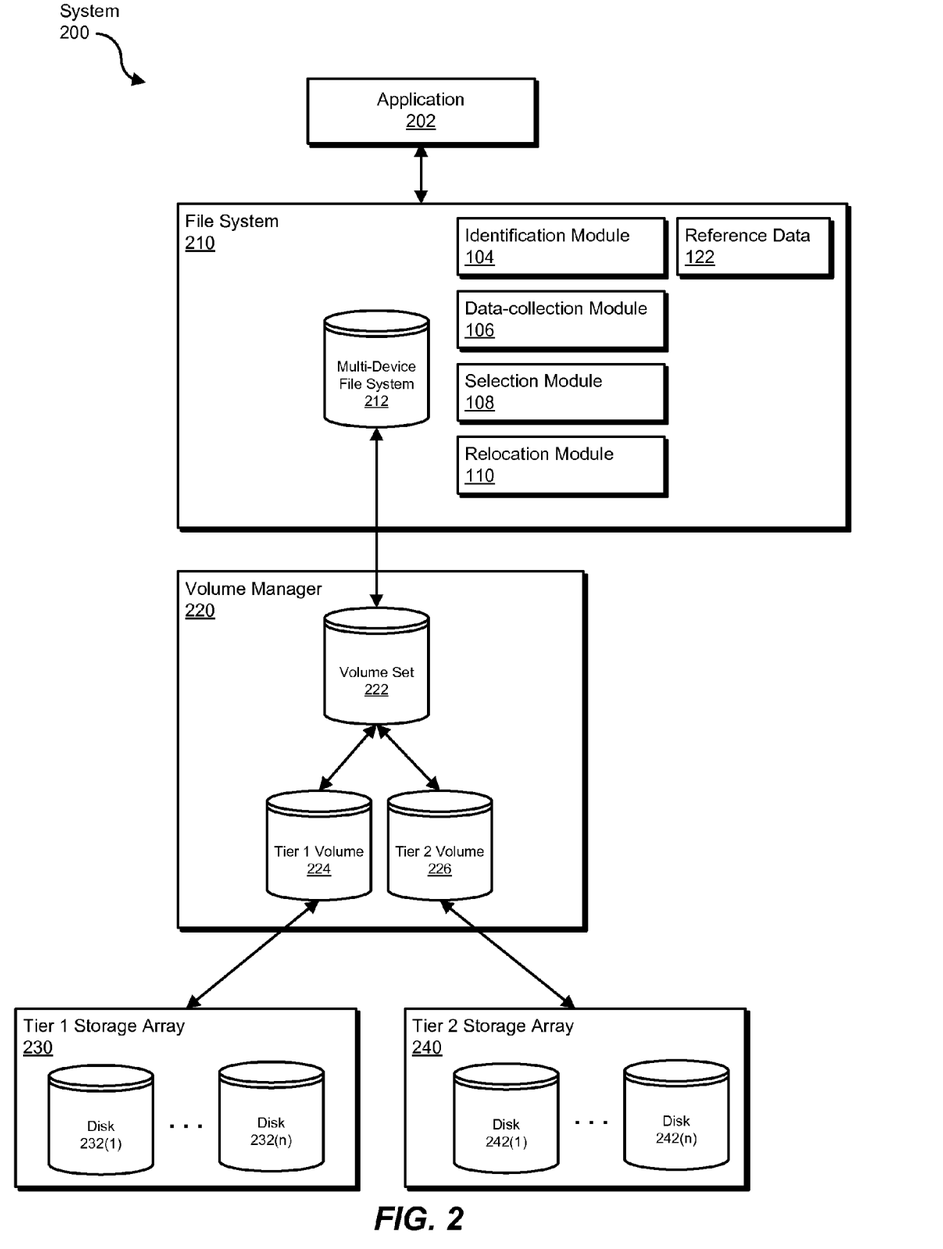
FIG. 2 is a block diagram of an exemplary system for relocating deduplicated data within a multi-device storage system.

The following will provide, with reference to FIGS. 1-2, detailed descriptions of exemplary systems for relocating deduplicated data within a multi-device storage system. Detailed descriptions of corresponding computer-implemented methods will also be provided in connection with FIGS. 3 and 4. In addition, detailed descriptions of an exemplary computing system and network architecture capable of implementing one or more of the embodiments described herein will be provided in connection with FIGS. 5 and 6, respectively.

FIG. 1 is a block diagram of an exemplary system 100 for relocating deduplicated data within a multi-device storage system. As illustrated in this figure, exemplary system 100 may include one or more modules 102 for performing one or more tasks. For example, and as will be explained in greater detail below, exemplary system 100 may include an identification module 104 programmed to identify a set of deduplicated data units stored on a first device of a multi-device storage system, where each data unit in the set of data units is referred to by one or more deduplication references. Exemplary system 100 may also include a data-collection module 106 programmed to procure reference data that indicates, for each data unit in the set of deduplicated data units, the number of deduplication references that point to the data unit.

In addition, and as will be described in greater detail below, exemplary system 100 may include a selection module 108 programmed to use the reference data to select one or more data units from the set of deduplicated data units for relocation to a second device in the multi-device storage system. System 100 may further include a relocation module 110 programmed to relocate the one or more data units to the second device in the multi-device storage system. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, as will be described in greater detail below, one or more of modules 102 may represent software modules stored and configured to run on one or more computing devices, such as the computing system 510 in FIG. 5 and/or portions of exemplary network architecture 600 in FIG. 6. One or more of modules 102 in FIG. 1 may also represent all or portions of one or more special-purpose computers configured to perform one or more tasks.

As illustrated in FIG. 1, exemplary system 100 may also include one or more databases 120. Databases 120 may represent portions of a single database or computing device or a plurality of databases or computing devices. In one embodiment, exemplary system 100 may include reference data 122 that stores reference information for one or more data unit. System 100 may also include deduplicated data 124, which may include one or more deduplicated data units.

Databases 120 in FIG. 1 may represent a portion of one or more computing devices. For example, databases 120 may represent a portion of computing system 510 in FIG. 5 and/or portions of exemplary network architecture 600 in FIG. 6. Alternatively, databases 120 in FIG. 1 may represent one or more physically separate devices capable of being accessed by a computing device, such as computing system 510 in FIG. 5 and/or portions of exemplary network architecture 600 in FIG. 6.

Exemplary system 100 in FIG. 1 may be deployed in a variety of ways. For example, all or a portion of exemplary system 100 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In some embodiments, exemplary system 100 may be deployed as a multi-tier storage system, such as system 200 in FIG. 2. While FIG. 2 shows a multi-tier storage system as an example of a multi-device storage system, embodiments of the instant disclosure may also apply to any other suitable multi-device storage system.

As shown in FIG. 2, system 200 may include an application 202 (e.g., a backup application, an archiving application, etc.) in communication with a file system 210. File system 210 may include a multi-device file system 212, identification module 104, data-collection module 106, selection module 108, relocation module 110, and reference data 122. While not shown in FIG. 2, deduplicated data 124 may be stored in one or more of the disks shown in FIG. 2.

Multi-device file system 212 may enable multi-tier storage. Multi-tier storage generally refers to the use of virtual or physical storage devices with different characteristics to provide differentiated storage for computing systems. For example, storage devices in a multi-device file system may have different Input/Output ("I/O") performance, data availability, and/or relative cost characteristics.

Storage system 200 may provide support for multi-volume file systems through multi-device file system 212 and may provide reference-based relocation of data within file system 210 through modules 104, 106, 108, and 110. Multi-volume file systems, as the name implies, may include file systems that occupy two or more virtual storage volumes. A multi-volume file system may present a single name space, making the existence of multiple volumes transparent to users and applications while maintaining awareness of each volume's identity, making it possible to control the locations at which portions of files are stored. In some embodiments, all files in such a file system may be part of the same name space and accessed and manipulated as though they occupy a single volume.

System 200 may also include a volume manager 220. Volume manager 220 may implement software-based virtualization for facilitating multi-tier storage in the form of virtual volumes configured from multiple hardware devices. Volume manager 220 may include a volume set 222. As used herein the phrase "volume set" generally refers to the volumes on which a file system in constructed. Volume set 222 may be divided into a tier 1 volume 224 and a tier 2 volume 226. For example, tier 1 volume 224 may include tier 1 storage array 230 (i.e., disk 232(1) through disk 232($n$)). Similarly, tier 2 volume 226 may include a tier 2 storage array 240 (i.e., disk 242(1) through disk 242 ($n$)).

Volume set 222 may be configured in a variety of manners. For example, tier 1 volume 224 and/or tier 2 volume 226 may be configured from enterprise disk array LUNS, mid-range disk array LUNS, and/or disks connected directly to their host systems. Tier 1 volume 224 and/or tier 2 volume 226 may also represent more complex configurations, such as mirrored volumes configured from RAID-5 LUNS presented by two disk arrays.

Volume set 222 may represent a single dimensional storage hierarchy (i.e., a storage hierarchy where better quality storage costs more). In other embodiments, volume set 222 may represent a multi-dimensional storage hierarchy. In such embodiments, storage performance may be influenced by hardware cost and configuration. Storage tiers created from physically similar components may also have significantly different costs based on the functionality they provide. For example, a tier of storage may be configured to take periodic full-sized snapshots or to replicate itself remotely, while another utilizing the same basic hardware components may not. As another example, while more expensive devices may outperform less expensive devices, virtual volumes with more columns (e.g., separate disks or LUNS) tend to outperform volumes with fewer columns, and thus the cost per usable byte of the two may be equal.

As a third example, mirrored, RAID-5, and striped LUNS or volumes of equivalent capacity may form an available hierarchy, with higher availability being more expensive. Additionally or alternatively, mirrored, RAID-5, and striped volumes may have different widths, or numbers of columns, resulting in different performance characteristics and differences in failure protection.

In some embodiments, disk 232(1) through disk 232(n) of tier 1 storage array 230 may include disk drives, while disk 242(1) through disk 242(n) of tier 2 storage array 240 may include solid-state drives.

Multi-tier storage systems, such as system 200, may provide optimized placement of data units based on one or more of a variety of criteria. For example, in some embodiments system 200 may optimize placement of data units based at least partially on how many references point to the data units. The following descriptions provide various examples of how deduplicated data may be relocated within a multi-device storage system, such as system 200, based on reference data.

Figure 3:
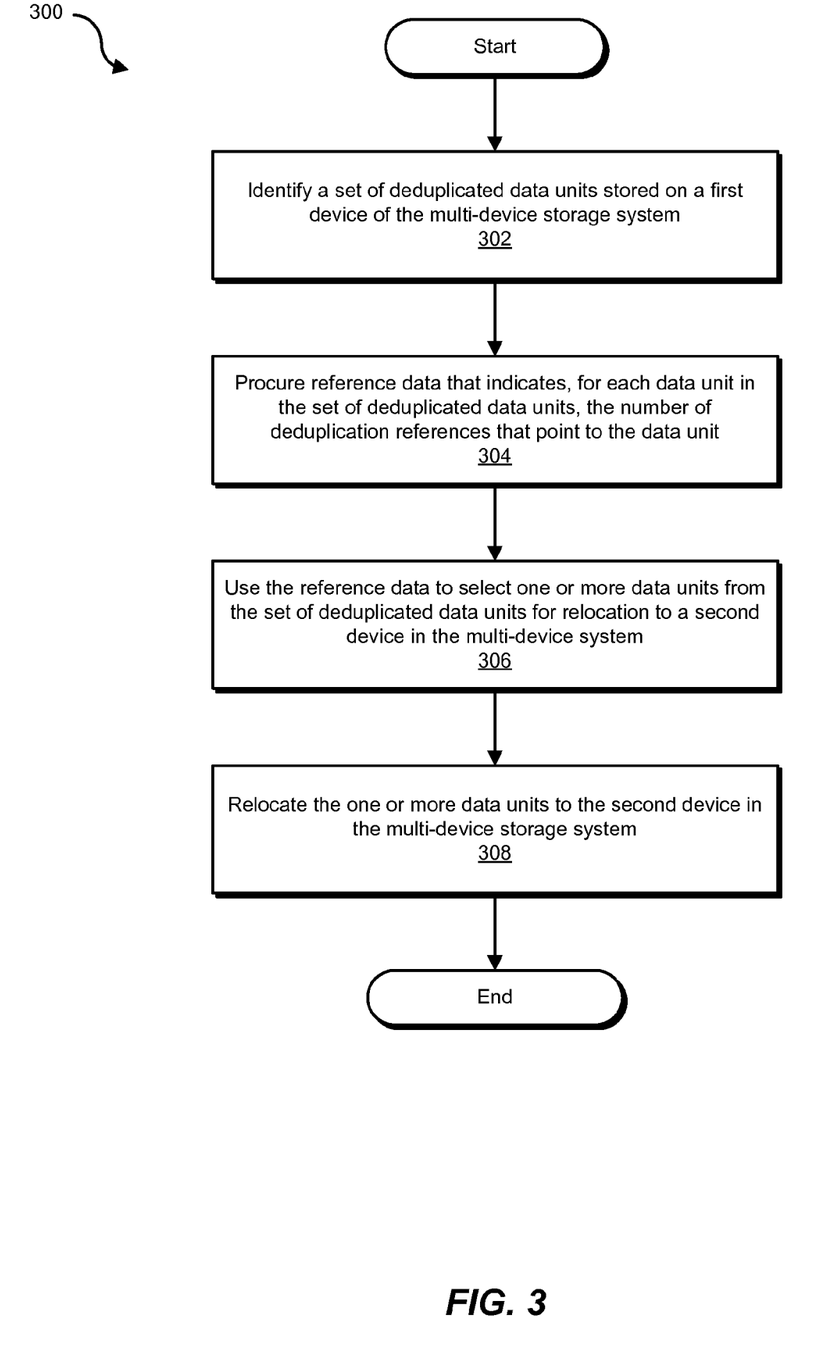
FIG. 3 is a flow diagram of an exemplary method for relocating deduplicated data within a multi-device storage system.

FIG. 3 is a flow diagram of an exemplary computer-implemented method 300 for managing portions of files in multi-tier storage systems. The steps shown in FIG. 3 may be performed by any suitable computer-executable code and/or computing system. In some embodiments, the steps shown in FIG. 3 may be performed by one or more of the components of system 100 in FIG. 1 and/or system 200 in FIG. 2.

At step 302 in FIG. 3, one or more of the systems described herein may identify a set of deduplicated data units stored on a first device of a multi-device storage system. For example, identification module 104 in FIG. 1 (which may, as detailed above, be included in file system 210 in FIG. 2) may identify a set of deduplicated data units stored on one or more devices of tier 1 storage array 230 of system 200.

The set of deduplicated data units may be identified in a variety of manners and in a variety of contexts. For example, the set of deduplicated data units may be identified in response to an administrator's request to optimize data storage. Additionally or alternatively, the set of deduplicated data units may be identified automatically after a set of data is deduplicated and/or in response to any other trigger.

As used herein, the phrase "set of deduplicated data units" generally refers to any set of one or more data units (e.g., files, blocks, sectors, clusters, etc.) that have been deduplicated. For example, a data set may include any set of one or more units of data that may be backed up or archived to system 200 and then deduplicated. Thus, in some embodiments, system 200 may represent and/or include a Single Instance Storage ("SIS") system. System 200 may include one or more collections of single-instance data (i.e., deduplicated data), such as a single-instance database, for example. Deduplicated data may refer to data that has been deduplicated using any suitable deduplication technology or algorithm. For example, deduplicated data may refer to data that has been deduplicated using a process that reduces the amount of storage space used in a single-instance data storage system, including processes for detecting and preventing data from being redundantly stored to the single-instance data storage system.

At step 304 in FIG. 3, one or more of the systems described herein may procure reference data that indicates, for each unit in the set of deduplicated data units, the number of deduplication references that point to the data unit. For example, data-collection module 106 in FIG. 1 (which may, as detailed above, be included in file system 210 in FIG. 2) may identify, calculate, or otherwise procure data that indicates the number of deduplication references that point to each data unit in the set of data units. In some embodiments, data-collection module 106 may procure reference data by accessing meta-data and/or other information in a deduplication system, a backup catalog, and/or any other data source. Such information may then be used to calculate a reference count.

In some embodiments, reference data may be created on an as-needed basis. In other embodiments, reference data may be collected periodically or continually (i.e., as data is added to a deduplication system) and stored in a reference data database. In such embodiments, procuring reference data may include accessing the reference data in the database.

As used herein, the term "references" may refer to indexes, pointers, fingerprints, hashes, and/or any other information used by a deduplication system to identify data. For example, when an instance of a data unit is first stored in a deduplication system, the deduplication system may create a reference that identifies the data. If the data unit is part of a first backup, the deduplication system may store the data unit in a deduplication data store and may store the reference in a data object associated with the first backup.

The number of deduplication references that point to a data unit may be referred to herein as a reference count for the data unit. A reference count may be calculated in a variety of ways. For example, a reference count may be calculated by summing the number of data objects that point to the data unit and the number of client devices associated with data objects that point to the data unit. In some embodiments, the number of data objects that point to a data unit may include the number of original data objects that point to the data unit and/or the number of data object revisions that point to the data unit.

In some embodiments, a reference count may indicate the number of duplicate copies of a data unit represented in a deduplication system. Deduplication systems may be used to backup data, archive data, and in a variety of other contexts where duplicate copies of data may need to be managed. For example, a deduplication system may receive a backup that includes hundreds of files and/or other data units. Some of the files in the backup may be duplicates. The deduplication system may store single instances of each of the files or other data units in a deduplication data store and may create a data object that represents the backup. Instead of including the actual data of the backup, the data object that represents the backup may include references to the files or other data units in the data store. While the deduplication data store may only store a single instance of a data unit that occurs multiple times in the backup, the data object that represents the backup may include a reference to the deduplicated data unit (i.e., the data unit in the data store) for each time the data unit occurs in the backup.

Continuing with the previous example, the deduplication data store may receive a second backup. Some of the data units in the second backup may be duplicates of data units from the first backup. Thus, a data object that represents the second backup may include references to some of the same deduplicated data units as the data object that represents the first backup.

As used herein, the phrase "data object" may refer to a collection of references that represent a set of data units (e.g., a backup of a set of data units, an archive of a set of data units, etc.). Additionally or alternatively, the phrase "data object" may refer to a single reference to a data unit. Thus, each reference within a data object that represents a backup set may also be referred to as a data object. Therefore, a reference count that includes the number of data objects that point to the data unit may include the total number of individual references that point to the data unit, the total number of collections of references (i.e., data objects that represent sets of data units) that include references that point to the data unit, or both.

As an example of a reference count that includes the number of individual references that point to a data unit, a deduplication system may include 25 references to a particular file. Thus, the reference count for the file may be 25. As an example of a reference count that includes the total number of collections of references that point to a data unit, a deduplication system may include ten data objects that represent ten different backups. Five of the ten backups may include references to a particular data object. In this example, since the reference count is based on the total number of collections of references rather that the total number of references, the reference count for the particular data object may only be five, even if some of the collections of references include multiple references to the data object.

As a third example, a reference count may include the total number of individual references that point to the data unit and the total number of collections of references that point to the data unit. In this example, five collections of references may include individual references that point to the data unit. Two of the five collections may include only one reference to the data unit, and three of the five collections may include two references to the data unit. Thus, the total number of individual references to the data unit may be eight, and the total reference count may be thirteen (eight plus five).

Various other algorithms may also be used to calculate a reference count. For example, a reference count may differentiate between the number of original data objects that point to a deduplicated data unit and the number of data object revisions that point to a deduplicated data unit. The phrase "original data object" generally refers to a data object that represents a segment of a first version of a file or other data unit. The phrase "data object revision" generally refers to a data object that represents an unmodified segment of a revised version of a file or other data unit.

For example, a user may create a first file that is stored in two segments. The user may save a second version of the file, with the first segment remaining unchanged and the second segment being modified. The user may also save a third version of the file, with the first segment remaining unchanged and the second segment being modified again. A deduplication system may store three data objects that represent the three versions of the file, and each data object may include two references—a reference to the first segment of the file and a reference to the second segment of the file. In this example, the number of data object revisions that point to the first segment is three. Thus, a reference count that includes the number of data object revisions that point to a data unit would include these three references in a data count for the first segment. As described in greater below, differentiating between the number of data object revisions that point to a data unit and the number of other original data objects that point to a data unit may be useful in calculating weighted reference counts.

Another example of an attribute that may be included in a reference count for a data unit is the number of clients associated with references to the data unit. For example, a deduplication system may store backup data for numerous client devices. If backup data for three of the devices include one or more references to a particular data unit, the number of clients associated with references to the data unit may be three.

Procuring reference data (i.e., a reference count) for a data unit may include summing the number of original data objects that point to the data unit, the number of data object revisions that point to the data unit, and/or the number of client devices associated with one or more data objects that point to the data unit. The sum may be weighted or unweighted. As an example of an unweighted sum, three references of original data objects may point to a deduplicated data unit, five references of data object revisions may point to the deduplicated data unit, and backup data objects of two client devices may include references to the deduplicated data unit. In this example, the reference count for the deduplicated data unit is ten.

In some embodiments, one or more components of a reference count may be weighted. For example, the number of original data objects that point to a data unit, the number of data object revisions that point to the data unit, and/or the number of client devices associated with the data unit may be multiplied by a weight. Weighting one or more components of a reference count may be advantageous in a variety of situations. For example, in a situation where a large number of restores to a large number of client devices may occur at the same time, the number of client devices associated with the data unit may be weighted higher than other components. As another example, in a single restore of all revisions to a large number of files, the number of data object revisions may be weighted higher than other components.

Weights for one or more components of a reference count may be configurable (i.e., configurable by a system administrator), hard coded, and/or variable. An example of a variable weight may be a weight that is based on a historical analysis of access patterns. Such a weight may vary over time. In some embodiments, data-collection module 106 may use historical reference data to select a subset of references that are more significant (e.g., references that point to data units that may be accessed more frequently) than other references. Data-collection module 106 may multiply references in the subset of references by a higher weight than the other references. For example, references to data units that are restored more frequently during a previous interval of time (e.g., over the previous month) may be weighted higher than references to a data unit that are restored less frequently. As another example, data-collection module 106 may use historical reference data to select a subset of references that point to a data unit that are more significant (e.g., data object revision references may be more significant if restorations of large numbers of file revisions are frequently performed) than other references that point to the data unit. The data-collection module may then multiply references in the subset of references by a higher weight than the other references that point to the data unit.

Returning to FIG. 3, at step 306 in FIG. 3 one or more of the systems described herein may use the reference data to select one or more data units from the set of deduplicated data units for relocation to a second device in the multi-device system. For example, after data-collection module 106 procures the reference data, selection module 108 may select one or more data units stored in multi-device file system 212 for relocation from a device in tier 1 storage array 230 to a device in tier 2 storage array 240.

Selection module 108 may select data units with the highest reference count for relocation to another device in the multi-device storage system. Selection module 108 may also use any other parameter, algorithm, and/or heuristic to use the reference data to select data units for relocation. For example, selection module 108 may select data units that are least likely to be accessed in a restore for relocation to a lower quality of service device. In such embodiments, selection module 108 may identify data units with relatively low reference counts for relocation to the second device in the multi-device storage system.

In some embodiments, the number of data units selected by selection module 108 may be defined by the amount of free space available on the second device (or devices) in the multi-device storage system. For example, if the second device has 50 GB available, selection module 108 may use reference data to select 50 GB of data units for relocation to the second device. Selection module 108 may additionally or alternatively use one or more other parameters to determine how many data units are selected for relocation to the second device. In some embodiments, selection module 108 may select all data units with references counts higher than a predetermined threshold for relocation to the second device.

At step 308 in FIG. 3 one or more of the systems described herein may relocate the one or more data units selected by selection module 108 to the second device in the multi-device storage system. For example, relocation module 110 may move the selected data units from a device in tier 1 storage array 230 to a device in tier 2 storage array 240. When relocation module 110 moves the selected data units from the first device to a second device, relocation module 110 may or may not delete the selected data units from the first device. In some embodiments, relocation module 110 may relocate data units to a device that may provide more efficient restoration of the data units (e.g., a solid-state drive). In other embodiments, relocation module 110 may relocate data to a lower quality of service device.

Figure 4:
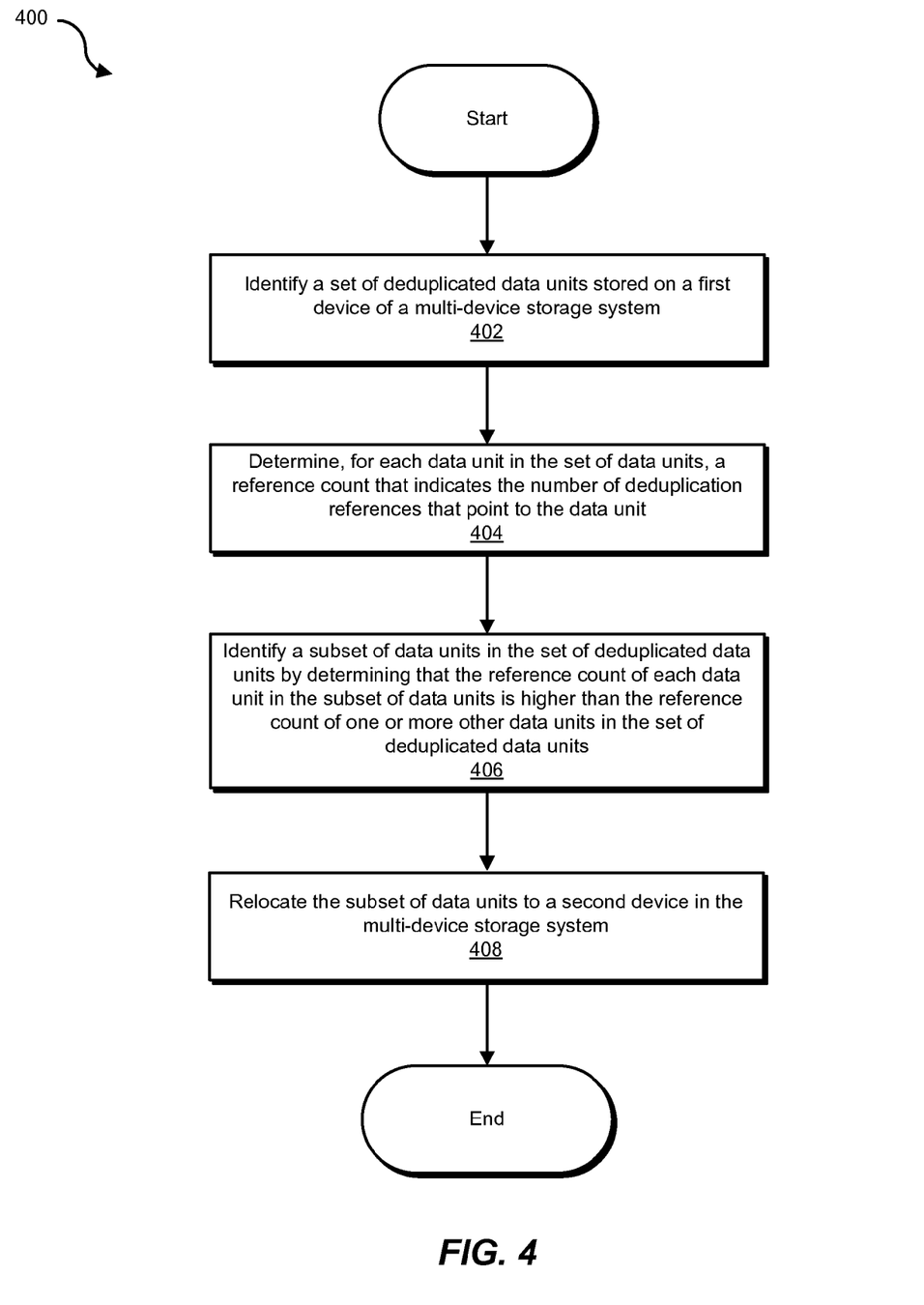
FIG. 4 is a flow diagram of an exemplary method for relocating deduplicated data within a multi-device storage system.

FIG. 4 is another flow diagram of an exemplary computer-implemented method 400 for managing portions of files in multi-tier storage systems. The steps in FIG. 4 may be performed by any suitable computer-executable code and/or computing system. Steps 402-408 in FIG. 4 are similar to steps 302-308 in FIG. 3, and therefore the discussion of steps 302-308 in FIG. 3 may apply to steps 402-408 in FIG. 4. In some embodiments, the steps shown in FIG. 4 may be performed by one or more of the components of system 100 in FIG. 1 and/or system 200 in FIG. 2.

At step 402 in FIG. 4, one or more of the systems described herein may identify a set of deduplicated data units stored on a first device of the multi-device storage system, where each data unit in the set of data units is referred to by one or more deduplication references. For example, identification module 104 may identify a set of deduplicated data units stored in tier 1 storage array 230.

At step 404 in FIG. 4, one or more of the systems described herein may determine, for each data unit in the set of data units, a reference count that indicates the number of deduplication references that point to the data units. For example, data-collection module 106 may access meta-data of multi-device file system 212 to determine how many deduplication references (e.g., original object references, revised object references, and/or client devices) point to each data unit in the set of data units.

At step 406 in FIG. 4, one or more of the systems described herein may identify a subset of data units in the set of deduplicated data units by determining that the reference count of each data unit in the subset of data units is higher than the reference count of one or more other data units in the set of deduplicated data units. For example, selection module 108 may select one or more data units with relative high reference counts. Then, at step 408 one or more of the systems described herein may relocate the subset of data units to a second device in the multi-device storage system. For example, relocation module 110 may move the subset of data units from tier 1 storage array 230 to tier 2 storage array 240.

Figure 5:
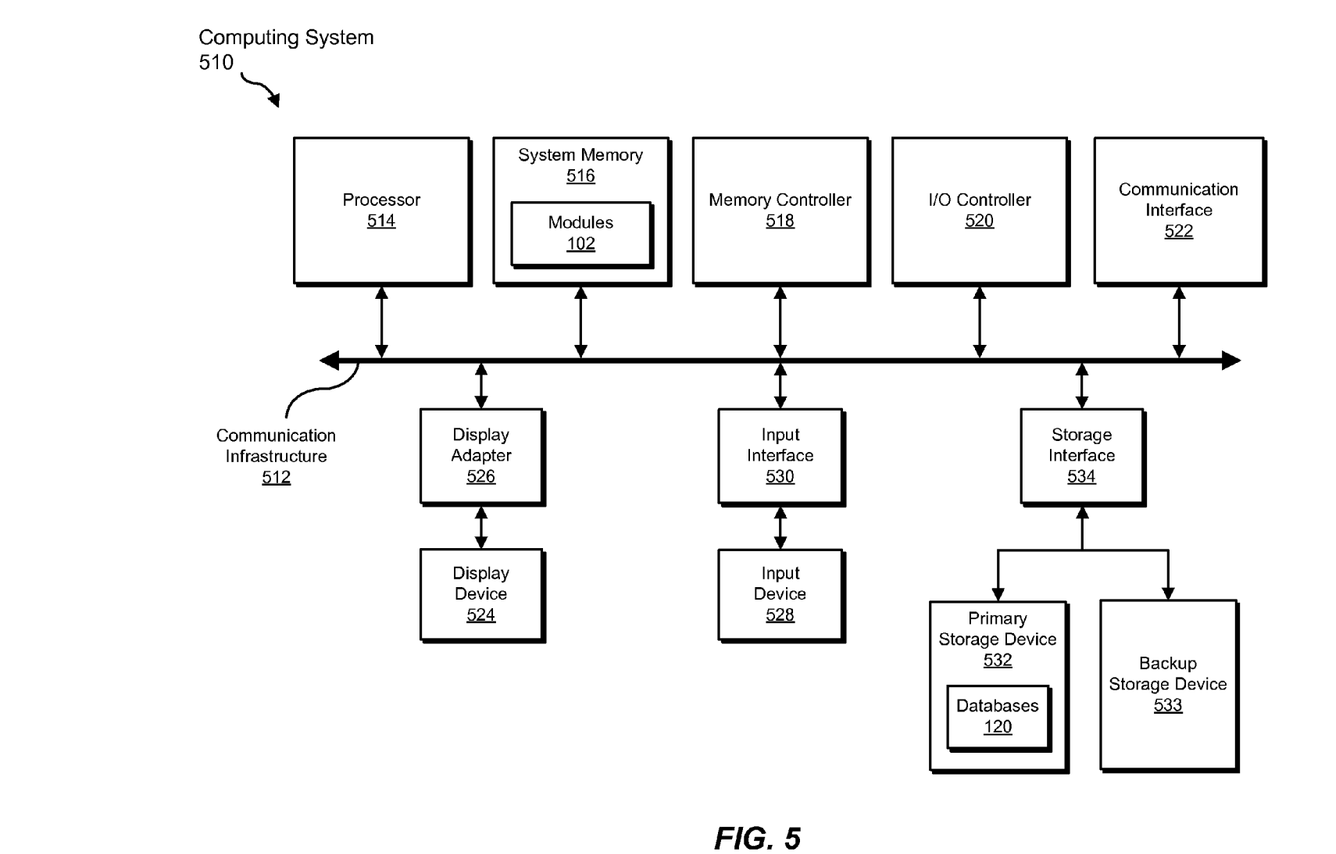
FIG. 5 is a block diagram of an exemplary computing system capable of implementing one or more of the embodiments described and/or illustrated herein.

FIG. 5 is a block diagram of an exemplary computing system 510 capable of implementing one or more of the embodiments described and/or illustrated herein. Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may include at least one processor 514 and a system memory 516.

Processor 514 generally represents any type or form of processing unit capable of processing data or interpreting and executing instructions. In certain embodiments, processor 514 may receive instructions from a software application or module. These instructions may cause processor 514 to perform the functions of one or more of the exemplary embodiments described and/or illustrated herein. For example, processor 514 may perform and/or be a means for performing, either alone or in combination with other elements, one or more of the identifying, procuring, using, relocating, summing, creating, multiplying, and determining steps described herein. Processor 514 may also perform and/or be a means for performing any other steps, methods, or processes described and/or illustrated herein.

System memory 516 generally represents any type or form of volatile or non-volatile storage device or medium capable of storing data and/or other computer-readable instructions. Examples of system memory 516 include, without limitation, random access memory (RAM), read only memory (ROM), flash memory, or any other suitable memory device. Although not required, in certain embodiments computing system 510 may include both a volatile memory unit (such as, for example, system memory 516) and a non-volatile storage device (such as, for example, primary storage device 532, as described in detail below). In one example, one or more of modules 102 from FIG. 1 may be loaded into system memory 516.

In certain embodiments, exemplary computing system 510 may also include one or more components or elements in addition to processor 514 and system memory 516. For example, as illustrated in FIG. 5, computing system 510 may include a memory controller 518, an Input/Output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an ISA, PCI, PCIe, or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512. In certain embodiments, memory controller may perform and/or be a means for performing, either alone or in combination with other elements, one or more of the steps or features described and/or illustrated herein, such as identifying, procuring, using, relocating, summing, creating, multiplying, and determining.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534. I/O controller 520 may be used, for example, to perform and/or be a means for performing, either alone or in combination with other elements, one or more of the identifying, procuring, using, relocating, summing, creating, multiplying, and determining steps described herein. I/O controller 520 may also be used to perform and/or be a means for performing other steps and features set forth in the instant disclosure.

Communication interface 522 broadly represents any type or form of communication device or adapter capable of facilitating communication between exemplary computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution. In certain embodiments, communication interface 522 may perform and/or be a means for performing, either alone or in combination with other elements, one or more of the identifying, procuring, using, relocating, summing, creating, multiplying, and determining steps disclosed herein. Communication interface 522 may also be used to perform and/or be a means for performing other steps and features set forth in the instant disclosure.

As illustrated in FIG. 5, computing system 510 may also include at least one display device 524 coupled to communication infrastructure 512 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, exemplary computing system 510 may also include at least one input device 528 coupled to communication infrastructure 512 via an input interface 530. Input device 528 generally represents any type or form of input device capable of providing input, either computer or human generated, to exemplary computing system 510. Examples of input device 528 include, without limitation, a keyboard, a pointing device, a speech recognition device, or any other input device. In at least one embodiment, input device 528 may perform and/or be a means for performing, either alone or in combination with other elements, one or more of the identifying, procuring, using, relocating, summing, creating, multiplying, and determining steps disclosed herein. Input device 528 may also be used to perform and/or be a means for performing other steps and features set forth in the instant disclosure.

As illustrated in FIG. 5, exemplary computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a floppy disk drive, a magnetic tape drive, an optical disk drive, a flash drive, or the like. Storage interface 534 generally represents any type or form of interface or device for transferring data between storage devices 532 and 533 and other components of computing system 510. In one example, databases 120 from FIG. 1 may be stored in primary storage device 532.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

In certain embodiments, storage devices 532 and 533 may be used, for example, to perform and/or be a means for performing, either alone or in combination with other elements, one or more of the identifying, procuring, using, relocating, summing, creating, multiplying, and determining steps disclosed herein. Storage devices 532 and 533 may also be used to perform and/or be a means for performing other steps and features set forth in the instant disclosure.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium" generally refers to any form of device, carrier, or medium capable of storing or carrying computer-readable instructions. Examples of computer-readable media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable medium containing the computer program may be loaded into computing system 510. All or a portion of the computer program stored on the computer-readable medium may then be stored in system memory 516 and/or various portions of storage devices 532 and 533. When executed by processor 514, a computer program loaded into computing system 510 may cause processor 514 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 510 may be configured as an application specific integrated circuit (ASIC) adapted to implement one or more of the exemplary embodiments disclosed herein.

Figure 6:
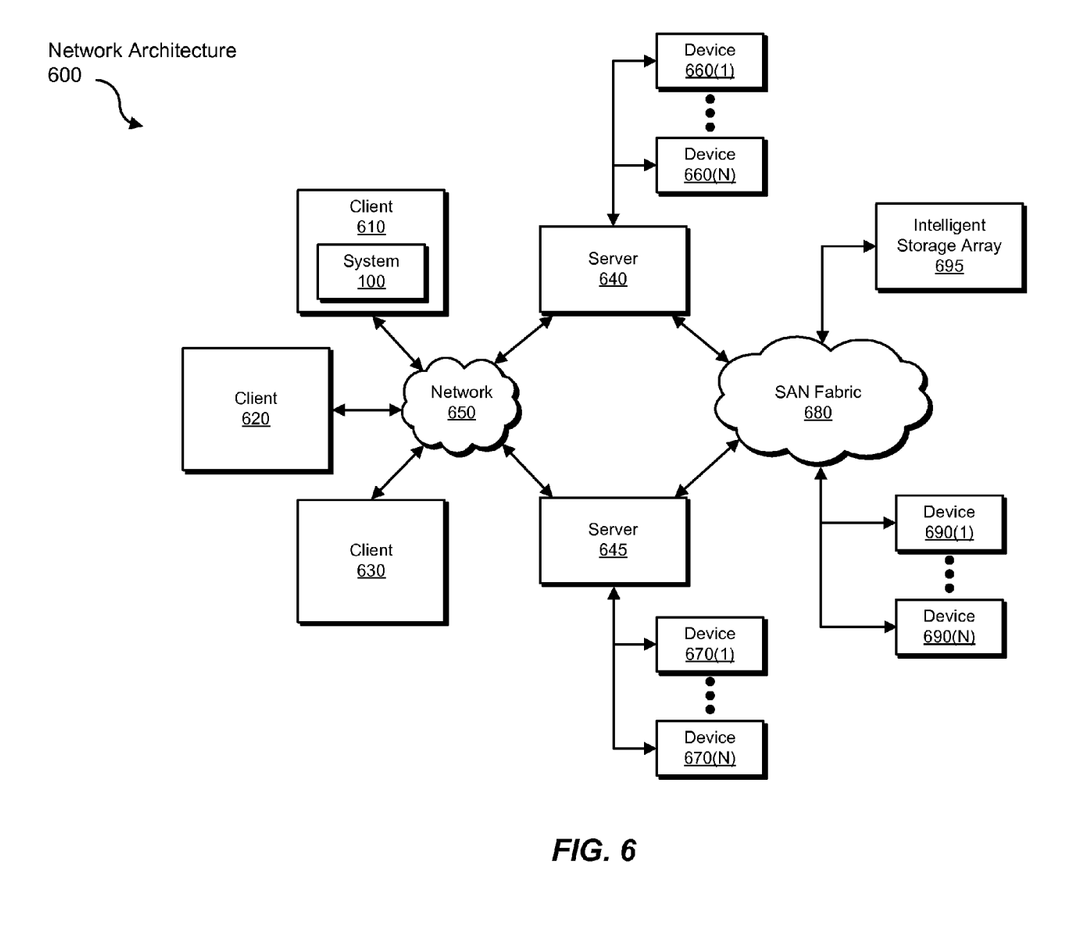
FIG. 6 is a block diagram of an exemplary network architecture capable of implementing one or more of the embodiments described and/or illustrated herein.

FIG. 6 is a block diagram of an exemplary network architecture 600 in which client systems 610, 620, and 630 and servers 640 and 645 may be coupled to a network 650. Client systems 610, 620, and 630 generally represent any type or form of computing device or system, such as exemplary computing system 510 in FIG. 5. In one example, client system 610 may include system 100 from FIG. 1.

Similarly, servers 640 and 645 generally represent computing devices or systems, such as application servers or database servers, configured to provide various database services and/or run certain software applications. Network 650 generally represents any telecommunication or computer network including, for example, an intranet, a wide area network (WAN), a local area network (LAN), a personal area network (PAN), or the Internet.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent network-attached storage (NAS) devices configured to communicate with servers 640 and 645 using various protocols, such as NFS, SMB, or CIFS.

Servers 640 and 645 may also be connected to a storage area network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to exemplary computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690(1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the exemplary embodiments disclosed herein may also be encoded as a computer program, stored in server 640, run by server 645, and distributed to client systems 610, 620, and 630 over network 650. Accordingly, network architecture 600 may perform and/or be a means for performing, either alone or in combination with other elements, one or more of the identifying, procuring, using, relocating, summing, creating, multiplying, and determining steps disclosed herein. Network architecture 600 may also be used to perform and/or be a means for performing other steps and features set forth in the instant disclosure.

As detailed above, computing system 510 and/or one or more components of network architecture 600 may perform and/or be a means for performing, either alone or in combination with other elements, one or more steps of an exemplary method for relocating deduplicated data within a multi-device storage system.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In certain embodiments, one or more of the software modules disclosed herein may be implemented in a cloud computing environment. Cloud computing environments may provide various services and applications via the internet. These cloud-based services (e.g., software as a service, platform as a service, infrastructure as a service, etc.) may be accessible through a web browser or other remote interface. Various functions described herein may be provided through a remote desktop environment or any other cloud-based computing environment. For example, data may be scanned, from, and/or to a cloud computing environment and/or one or more of modules 102 may operate in a cloud computing environment.

In addition, one or more of the modules described herein may transform data, physical devices, and/or representations of physical devices from one form to another. For example, one or more of the modules described herein may transform a deduplication system into a system capable of more efficient restoration by using reference counts to relocate deduplicated data units from one storage device to another storage device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for relocating deduplicated data within a multi-device storage system, at least a portion of the method being performed by a computing device comprising at least one processor, the method comprising:
   identifying a set of deduplicated data units stored on a first device in the multi-device storage system, wherein each data unit in the set of deduplicated data units is referred to by one or more deduplication references;
   procuring reference data that indicates, for each data unit in the set of deduplicated data units, a number of deduplication references that point to the data unit, wherein the number of references that point to the data unit comprises a count of how many references point to the data unit;
   using the reference data to select one or more data units from the set of deduplicated data units for relocation to a second device in the multi-device storage system by determining that a number of deduplication references that point to the one or more selected data units is greater than a number of deduplication references that point to one or more other data units in the set of deduplicated data units;
   relocating the one or more selected data units to the second device in the multi-device storage system by moving the one or more selected data units with relatively high deduplication reference counts to a device with higher performance than the first device.

2. The method of claim 1, wherein the number of deduplication references that point to the data unit includes, for each data unit in the set of deduplicated data units, at least one of:
   a number of original data objects that point to the data unit;
   a number of data object revisions that point to the data unit;
   a number of client devices associated with data objects that point to the data unit.

3. The method of claim 2, further comprising counting at least one of:
   the number of original data objects that point to the data unit;
   the number of data object revisions that point to the data unit;
   the number of client devices associated with data objects that point to the data unit.

4. The method of claim 2, wherein procuring the reference data comprises summing at least two of:
   the number of original data objects that point to the data unit;
   the number of data object revisions that point to the data unit;
   the number of client devices associated with data objects that point to the data unit.

5. The method of claim 4, wherein procuring the reference data comprises:
   creating a first weighted count by multiplying the number of data object revisions by a first weight;
   creating a second weighted count by multiplying at least one of the following by a second weight:
      the number of original data objects that point to the data unit;
      the number of client devices associated with data objects that point to the data unit;
   summing the first and second weighted counts to provide the reference count for the data unit, wherein the first weight is greater than the second weight.

6. The method of claim 4, wherein procuring the reference data comprises:
   creating a first weighted count by multiplying the number of client devices associated with data objects that point to the data unit by a first weight;
   creating a second weighted count by multiplying at least one of the following by a second weight:
      the number of original data objects that point to the data unit;
      the number of data object revisions that point to the data unit;
   summing the first and second weighted counts to provide the reference count for the data unit, wherein the first weight is greater than the second weight.

7. The method of claim 1, wherein procuring the reference data comprises, for each data unit in the set of deduplicated data units:
   using historical reference data to select a subset of references that point to the data unit that are more significant than one or more other references that point to the data unit;

multiplying references in the subset of references by a higher weight than the other references that point to the data unit.

8. The method of claim 1, wherein procuring the reference data comprises:
using historical data unit data to select a data unit from the set of deduplicated data units that is more significant than other data units in the set of deduplicated data units;
multiplying the number of deduplication references that point to the selected data unit by a first weight;
multiplying the number of deduplication references that point to the other data units in the set of deduplicated data units by a second weight, wherein the first weight is greater than the second weight.

9. The method of claim 1, wherein:
the second device in the multi-device storage system comprises a solid-state drive with higher performance for random access than the first device.

10. The method of claim 1, tangibly embodied as computer-executable instructions on at least one computer-readable medium.

11. A system for relocating deduplicated data within a multi-device storage system, the system comprising:
at least one processor;
an identification module programmed to direct the processor to identify a set of deduplicated data units stored on a first device in the multi-device storage system, wherein each data unit in the set of deduplicated data units is referred to by one or more deduplication references;
a data-collection module programmed to direct the processor to procure reference data that indicates, for each data unit in the set of deduplicated data units, a number of deduplication references that point to the data unit, wherein the number of references that point to the data unit comprises a count of how many references point to the data unit;
a selection module programmed to direct the processor to use the reference data to select one or more data units from the set of deduplicated data units for relocation to a second device in the multi-device storage system by determining that a number of deduplication references that point to the one or more selected data units is greater than a number of deduplication references that point to one or more other data units in the set of deduplicated data units;
a relocation module programmed to direct the processor to relocate the one or more selected data units to the second device in the multi-device storage system by moving the one or more selected data units with relatively high deduplication reference counts to a device with higher performance than the first device.

12. The system of claim 11, wherein the number of deduplication references that point to the data unit includes, for each data unit in the set of deduplicated data units, at least one of:
a number of original data objects that point to the data unit;
a number of data object revisions that point to the data unit;
a number of client devices associated with data objects that point to the data unit.

13. The system of claim 12, wherein the data-collection module is further programmed to direct the processor to count at least one of:
the number of original data objects that point to the data unit;
the number of data object revisions that point to the data unit;
the number of client devices associated with data objects that point to the data unit.

14. The system of claim 12, wherein the data-collection module is programmed to direct the processor to procure the reference count by summing at least two of:
the number of original data objects that point to the data unit;
the number of data object revisions that point to the data unit;
the number of client devices associated with data objects that point to the data unit.

15. The system of claim 14, wherein the data-collection module is programmed to direct the processor to procure the reference count by:
creating a first weighted count by multiplying the number of data object revisions by a first weight;
creating a second weighted count by multiplying at least one of the following by a second weight:
the number of original data objects that point to the data unit;
the number of client devices associated with data objects that point to the data unit;
summing the first and second weighted counts to provide the reference count for the data unit, wherein the first weight is greater than the second weight.

16. The system of claim 14, wherein the data-collection module is programmed to direct the processor to procure the reference count by:
creating a first weighted count by multiplying the number of client devices associated with data objects that point to the data unit by a first weight;
creating a second weighted count by multiplying at least one of the following by a second weight:
the number of original data objects that point to the data unit;
the number of data object revisions that point to the data unit;
summing the first and second weighted counts to provide the reference count for the data unit, wherein the first weight is greater than the second weight.

17. The system of claim 11, wherein:
the second device in the multi-device storage system comprises a solid-state drive.

18. A computer-implemented method for relocating deduplicated data within a multi-device storage system, at least a portion of the method being performed by a computing device comprising at least one processor, the method comprising:
identifying a set of deduplicated data units stored on a first device in the multi-device storage system, wherein each data unit in the set of deduplicated data units is referred to by one or more deduplication references;
determining, for each data unit in the set of deduplicated data units, a reference count that indicates a number of deduplication references that point to the data unit, wherein the number of references that point to the data unit comprises a count of how many references point to the data unit;
identifying a subset of data units in the set of deduplicated data units by determining that the reference count of each data unit in the subset of data units is higher than the reference count of one or more other data units in the set of deduplicated data units;
relocating the subset of data units to a second device in the multi-device storage system.

19. The method of claim 18, wherein:
the second device comprises a solid state drive.

* * * * *